United States Patent
Onda et al.

[11] 3,854,144
[45] Dec. 10, 1974

[54] FOCAL PLANE SHUTTER WITH GROUPS OF SHUTTER BLADES IN IMPROVED ARRANGEMENT

[75] Inventors: Eiichi Onda, Misato; Mitsuo Koyama; Tadashi Nakagawa, both of Chiba, all of Japan

[73] Assignee: Seiko Koki Kabushiki Kaisha, Tokyo, Japan

[22] Filed: Sept. 25, 1973

[21] Appl. No.: 400,612

[30] Foreign Application Priority Data
Sept. 26, 1972 Japan............................ 47-111776

[52] U.S. Cl.................................. 354/246, 354/249
[51] Int. Cl........................... G03b 9/36, G03b 9/18
[58] Field of Search............................ 354/246, 249

[56] References Cited
UNITED STATES PATENTS
3,078,776   2/1963   Okabe............................... 354/246
3,628,438   12/1971  Loseries............................ 354/246

Primary Examiner—Samuel S. Matthews
Assistant Examiner—R. E. Adams, Jr.
Attorney, Agent, or Firm—Robert E. Burns; Emmanuel J. Lobato; Bruce L. Adams

[57] ABSTRACT

A focal plane shutter for a camera having two groups of shutter blades. One group opens the shutter and the other closes it. The groups each have a slit-forming shutter blade translated on a pair of levers. The remaining blades of each group are pivoted and pivotally actuated. The slit-forming shutter blades each have a straight edge moved across the shutter aperture normal to a plane traversing the shutter aperture so that the exposure aperture is accurately developed as the shutter is opened or closed. The slit-forming shutter blades are disposed remotest from each other with the remaining pivoted blades of both groups are disposed therebetween. The paired levers of each group are mounted outwardly of the corresponding slit-forming blade and outwardly of the two groups of shutter blades in an improved arrangement.

5 Claims, 6 Drawing Figures

FOCAL PLANE SHUTTER WITH GROUPS OF SHUTTER BLADES IN IMPROVED ARRANGEMENT

BACKGROUND OF THE INVENTION

This invention relates generally to camera shutters and more particularly to focal plane shutters.

In camera shutters wherein the shutter blades are arranged in groups the driving parts of a group are pivotally mounted separately from the shutter blades which are likewise pivotally mounted. This results in increased bulkiness of the shutters and a more complex construction. In focal plane shutters constructed with a plurality of groups of shutter blades the blades tend to be large because of the large exposure aperture. Thus the use of shutter blades divided into groups in miniature focal plane shutters presents special problems. In order to obtain overlapping of the shutter blades for adequate light interruption the shutter blades have to be made large and this increases the inertia of the shutter.

SUMMARY OF THE INVENTION

It is a principal object of the present invention to provide a new and improved focal plane shutter in which the shutter blades are divided into two groups and constructed with smaller components and smaller shutter blades that provide excellent light-interrupting characteristics and avoid the necessity of using enlarged shutter blades.

The focal plane shutter according to the invention has two opposed plates spaced from each other defining a space within which are housed two sets of groups of shutter blades. The two plates have openings in registry that define the shutter aperture. The shutter blades are divided into groups. The first group is normally in a first operative position closing the shutter aperture when the shutter is in a cocked condition and are operable to a second operative position opening the shutter aperture. A second group of shutter blades is normally disposed in a first operative position in which the shutter is closed by the first group. This second group is operable to a second operative position closing the shutter aperture. Each group of shutter blades has a slit-forming shutter blade that has a straight edge for accurately defining the exposure aperture as the shutter aperture is opened and closed. The straight edges move parallel to their rest positions as they traverse the shutter aperture. The straight edge of the first group is a trailing edge accurately opening the shutter aperture and the straight edge of the second group is a leading edge accurately closing the shutter aperture.

Each group of shutter blades has a pair of levers for supporting and transporting the corresponding slit-forming shutter blade. One of these levers is a driven lever and the other is an auxiliary lever. The levers of all the groups are pivotally mounted in a common plane alongside the shutter aperture. The free end of these levers are connected to their slit-forming shutter blades so that the slit-forming straight edges traverse the exposure aperture in parallel positions. That is to say these edges move parallel to their rest positions and normal to a plane that traverses the exposure aperture and in which lie the connections of the free ends of the levers to the slit-forming shutter blades.

The driven levers and the shutter blades are superposed so that the driven levers can actuate the corresponding slit-forming shutter blade and the remainder of the shutter blades of its group through a pin extending from it through slots of different lengths in the remainder of shutter blades. In the embodiments a separate drive drives the driven lever in conjunction with the remainder of shutter blades. In each case the blades are driven in a sequence from a superposed position to a fan-shaped arrangement closing the exposure aperture.

The slit-forming shutter blades of both groups define a space in which the other pivoted of both groups are disposed. The two slit-forming blades are disposed remotest from each other and the other blades are disposed therebetween in interleaved spaces and in reverse order or sequence vertically in that space. The paired levers for transporting the slit-forming shutter blades and actuating the blades are disposed outwardly of the corresponding slit-forming shutter blades.

BRIEF DESCRIPTION OF THE DRAWINGS

Other features and advantages of the focal plane shutter in accordance with the invention will be better understood as described in the following specification, and appended claims with the following drawings in which:

DESCRIPTION OF THE PREFERRED EMBODIMENTS

Figure 1:
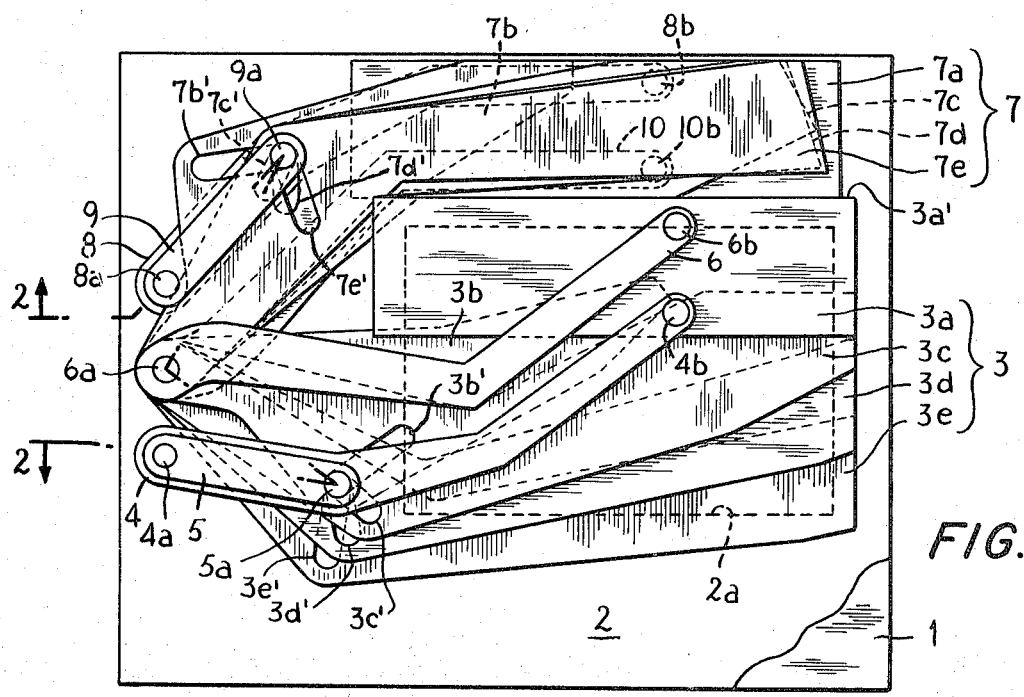
FIG. 1 is a plan view of a focal shutter according to the invention illustrated in a cocked condition.

As shown in the drawings a focal plane according to the invention has a baseplate 1 which has an opening 1a thereon. A second or press plate 2 is disposed opposed to or confronting the baseplate 1 and has an opening 2a in registry with the other opening defining an exposure aperture. The plates are held spaced from each other in fixed positions by spacers, not shown, and jointly define a space therebetween. The two plates may have a similar configuration.

Figure 3:
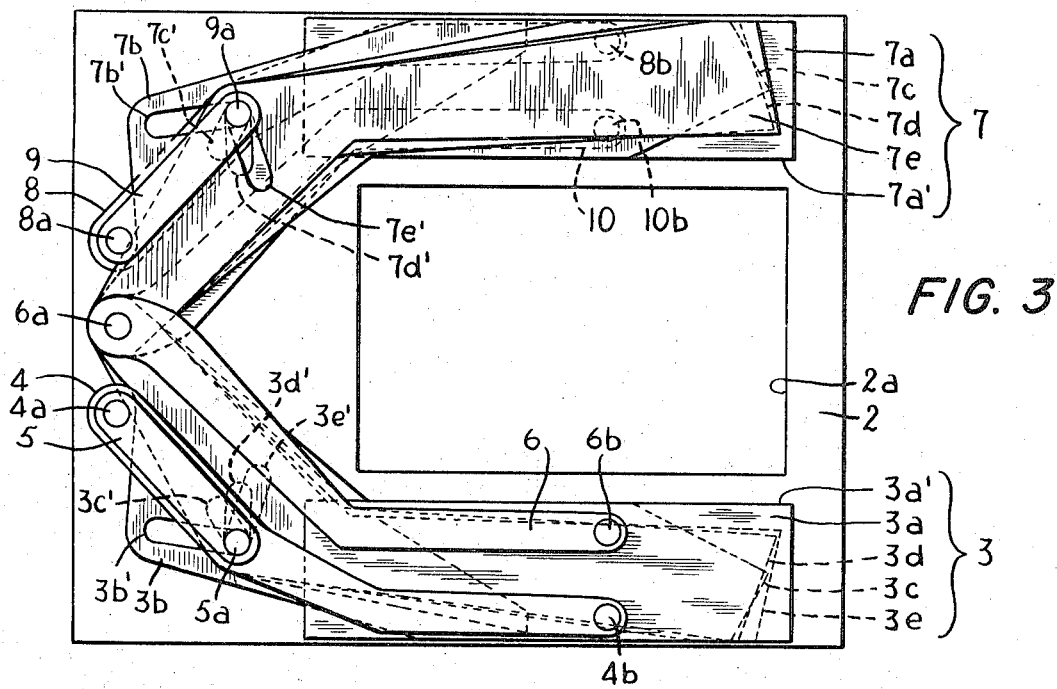
FIG. 3 is a plan view of the focal plane shutter in FIG. 1 illustrated in an open condition for taking of a photographic exposure.
Figure 4:
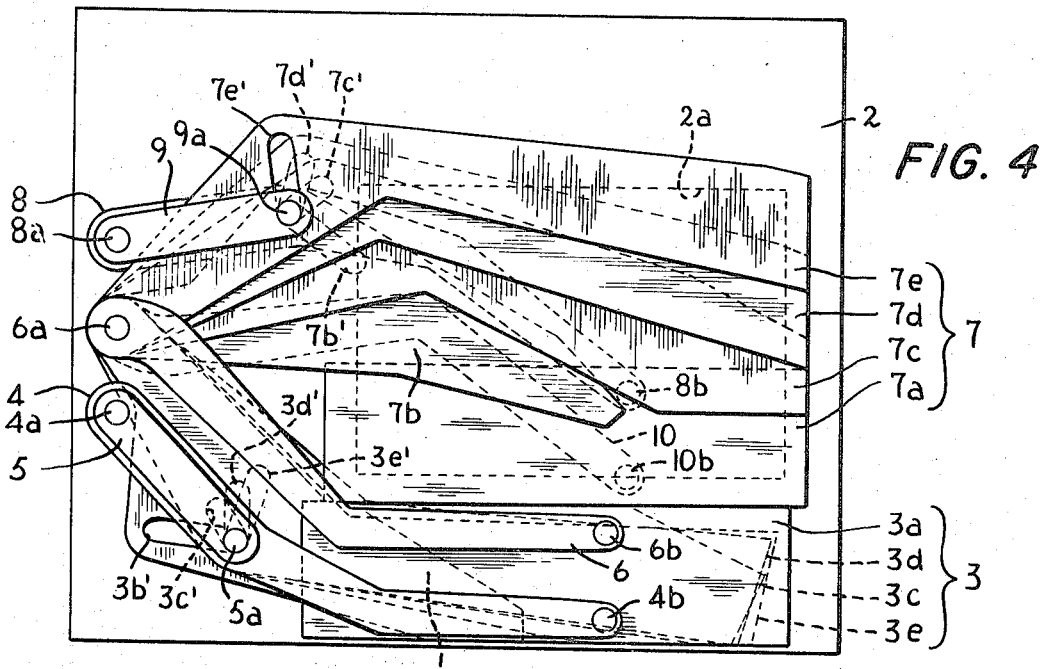
FIG. 4 is a plan view of the focal plane shutter in FIG. 3 illustrated in a closed condition subsequent to the taking of a photographic exposure.

Within the space between the plates are housed the shutter blades divided into two groups 3, 7. A first group 3 is a shutter-opening group of shutter blades that close the shutter when in a first operative position when the shutter is cocked as shown in FIG. 1. They are operable to a second operative position as shown in FIG. 3 in which the shutter is open. The second group of shutter blades 7 has a normal first operative position in which the blades are superposed alongside the shutter aperture and are operable to a second operative position closing the shutter aperture as shown in FIG. 4.

The first or shutter-opening group of shutter blades comprises an opening slit-forming shutter blade 3a and pivotally mounted covering blades 3b, 3c, 3d, 3e. The slit-forming shutter blade is carried or transported by a driven lever 4 pivoted on a pivot 4a and having a free end connected at 4b to the slit-forming shutter blade and by an auxiliary lever 6 made as two lengths which are extensions of each other and at an angle to each other. The auxiliary lever is pivoted on a pivot 6a and is connected at 6b to the slit-forming shutter blade. The remainder of the group of blades are superposed and pivoted at the pivot 6a in common with the auxiliary lever 6.

Figure 2:
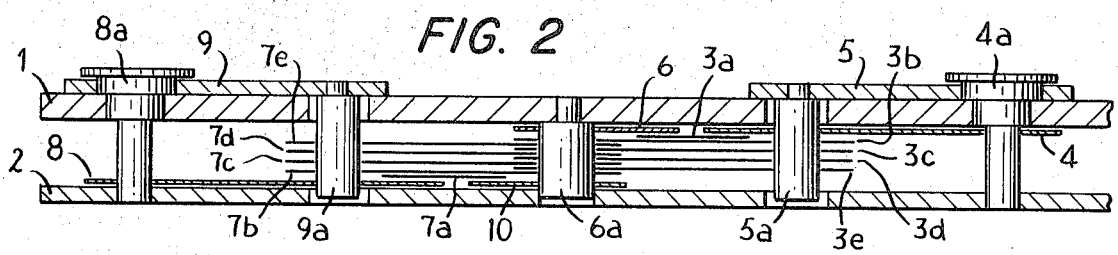
FIG. 2 is a section view taken along section line 2—2 of FIG. 1.

A driving plate or lever 5 is mounted on the baseplate 1 pivotal about the pivot 4a of the driven lever 4 and extends axially parallel to a length of the driven lever as shown in FIGS. 1 and 2. The driving lever 5 is provided with a downwardly extending driving pin 5a that extends through an opening in the baseplate 1 into the space between the two baseplates 1 and 2 of the shutter. The driving pin 5a is received in slots 3b'–3e' of the corresponding pivoted shutter blades 3b–3e for driving them sequentially to their two operative positions alternately and extends through driven lever 4 and transports it along. The shutter-opening blades are opened when the driving lever 5a is released and driven, for example by spring means not shown.

The second or shutter-closing group of shutter blades 7 constitute a slit-forming shutter blade 7a transported on a driven lever 8 pivoted on a pivot 8a and having a free end connected at 8b to the slit-forming shutter blade 7a. An auxiliary lever 10 helps in transporting or translating the second slit-forming shutter blade and is pivoted on the pivot 6a and of the other auxiliary lever 6 has a free end connected at 10b to the slit-forming shutter blade 7a. The remainder of the blades 7b–7e are pivoted on the pivot 8a of the group's auxiliary lever 8.

A drive plate 9 is mounted on the baseplate 1 pivotal about the pivot 8a of the second group driven lever 8 and extends axially parallel to the length of the second group driven lever 8 as shown in FIGS. 1 and 2. The driving lever 9 is provided with a downwardly extending driving pin 9a that extends through an opening in the baseplate 1 into the space between the two baseplates 1 and 2 of the shutter. The driving pin 9a is received in slots 7b'–7e' of the corresponding pivoted shutter blades 7b–7e for driving them sequentially to their two operative positions alternately and extends through the second group driven lever 8 and transports it along. The shutter-closing blades are closed when the second group driving lever 9a is released and driven, for example by spring means not shown.

The slit-forming shutter blades each have a straight edge that functions to accurately define the shutter exposure aperture as it is opened or closed. A straight edge 3a' of the first group slit-forming blade 3a functions as a trailing edge as the shutter is opened. A straight edge 7a' of the second group slit-forming shutter blade 7a functions as a leading edge as the shutter is closed. The pivots of the paired levers carrying the two slit-forming shutter blades 3a, 7a are disposed in a common plane alongside the shutter aperture 1a, 2a. The pivots of the paired levers and the free end connections on the slit-forming shutter blades are spaced from each other as shown. The positions and spacing of these pivots and free end connections insures that the straight edges of the slit-forming shutter blades move across the shutter aperture parallel to their rest positions or normal to the plane in which the fee end connections lie. Thus the exposure aperture is always accurately formed as the groups of blades are operated. It will be noted the two sets of shutter blades and their paired levers are mirror images of each other.

The shutter blades are driven to their second operative positions for opening and closing the shutter. When the shutter-operating mechanism is operated for opening the shutter the driven lever 5 is rotated clockwise by a spring not shown actuating the driven lever 4 and it moves the slit-forming shutter blade 3a connected thereto and its paired auxiliary lever 5 is carried along the parallel movement of the slit-forming shutter blade takes place.

The driven lever 5 is provided with the driving pin 5a that extends through elongated slots on the remainder of pivotally driven blades 3b–3e. These latter shutter blades are pivotally driven by the driven lever 4 sequentially, because of the various lengths of the slots, from a fan-shaped position to a superposed position alongside the shutter aperture so that the shutter is opened as shown in FIG. 3.

The shutter is closed when the exposure is completed. The shutter-operating mechanism, not shown, releases the pivot 8a of the driven lever 8 of the shutter-closing group and the driving lever 9 is driven clockwise by a spring not shown so that the leading edge of the slit-forming shutter blade 6a is advanced parallel as before described in conjunction with the auxiliary lever 10. The driving lever has a driving pin 9a that extends into the different length elongated slits 7b'–7e' formed in the remainder of the shutter blades 7b–7e. This driving pin drives these blades sequentially so that the blades are moved from their superposed position to a fan-shaped position closing the shutter as shown in FIG. 4.

The shutter is cocked or charged by actuating cocking mechanism, not shown, by actuating either the driven levers 4, 7, the driving levers 5, 9 or the auxiliary levers 6, 10 in a direction against the force of the springs that drives the pivots of the driven operating levers.

The arrangement of the shutter blades and the various levers of the invention is shown in cross section in FIG. 2. As can be seen the driving levers 5, 9 are disposed on the baseplate 1 and their respective pivots 4a, 8a. Their driving pins 5a, 9a extend through the baseplate and extend into the slots of the pivoted blades as before described. The common pivot 6a of both groups of pivoted shutter blades and the auxiliary levers 6, 10 is shown mounted on the baseplate 1.

The arrangement of the two groups of shutter blades in the space between the baseplate 1 and press plate 2 is of significance. The slit-forming shutter blades 3a, 7a are disposed remotest from each other. The shutter blades of the two groups are arranged alternately so that they are in effect interleaved as to their relative positions. There is no possibility of interference of one group of shutter blades with the other group. The various levers are disposed outwardly of the groups of shutter blades as shown.

The shutter blades of the two groups are arranged in reverse order. The uppermost group is the shutter-closing group 3 and its slit-forming shutter blade is closest to the baseplate 1. The pivoted blades 3b–3e follow in a descending sequence. The shutter-closing group 7 of shutter blades is arranged closer to the press plate 2.

The slit-forming shutter blade 7a is furthest removed from the other slit-forming blade 3a. The pivoted shutter blades 7b–7e are arranged in an ascending order.

Figure 5:
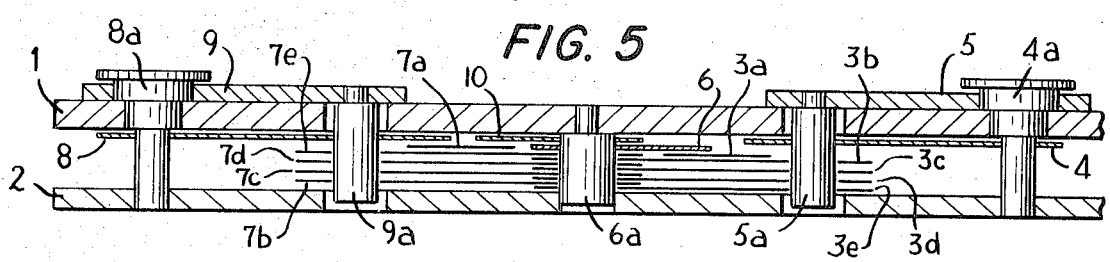
FIG. 5 is a cross section view of a prior art embodiment of a focal plane shutter.

A known or prior art embodiment of a focal plane shutter of the type of the present invention is illustrated in cross section in FIG. 5 in which the reference numerals of the various parts correspond to the same parts of the present invention. As can be seen in the prior art embodiment two slit-forming shutter blades 3a, 7a are arranged on a same side of the space between the baseplate 1 and press plate 2. Both of these slit-forming blades 3a, 7a are adjacent to the baseplate 1. Thus the slit-forming shutter blade of one group becomes an obstacle to the auxiliary lever 6, 10 of the other making it impossible to increase the overlapped part. Hence in the prior art focal plane shutter in order to promote light interruption properties, when the shutter is being charged or cocked, it is necessary to enlarge each slit-forming blade and to make the distance between the straight edge thereof and the corresponding auxiliary lever to obtain increase of the overlapping of the shutter blades. Consequently the prior art focal plane shutters have to be constructed larger than that of the present invention.

Figure 6:
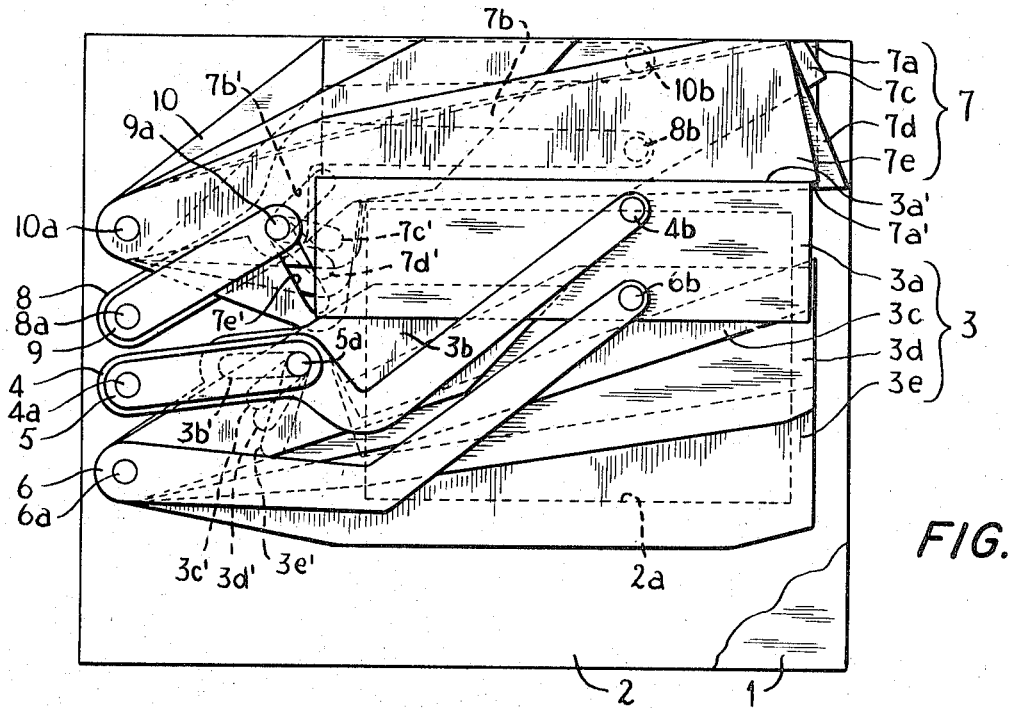
FIG. 6 is a plan view of a second embodiment of a focal plane shutter according to the invention.

A second embodiment of a focal plane shutter according to the invention is illustrated in FIG. 6. In this embodiment the same reference numerals are employed on parts corresponding to or similar to that of the first embodiment. In this embodiment two plates 1, 2 define a shutter aperture 1a, 2a. Two groups of shutter blades 3, 7 are provided having slit-forming shutter blades 3a, 7a and related pivoted blades 3b–3e, 7b–7e. The shutter-closing group has its slit-forming shutter blade 3a supported by paired parallel levers 4, 6 pivoted respective pivots 4a, 6a and connected thereto at 4b, 6b and actuated by a driving lever 5, coaxial with the driven lever 2 having a driving pin 5a extending into elongated slots 3b'–3e' of the pivoted blades and through the driven lever 4.

The shutter-opening group of shutter blades 7 have their slit-forming shutter blade 7a transported by paired parallel levers 8, 10 on respective pivots 8a, 10a and connected at 8b, 10b thereto. A driving lever 9 is pivoted coaxial with the driven lever and has a driving pin 9a extending into the elongated slots of 7b'–7e' of the pivoted blades.

This second embodiment is not shown in cross section but the shutter blades have the same cross section arrangement of the first embodiment.

While the pivoted shutter blades are shown pivoted in common with the auxiliary levers of their respective groups it is possible to pivot them on the pivot of their driven levers. Furthermore, the driving plates or levers may be eliminated and instead the driven levers may be spring driven.

It is likewise possible to shorten the distance between the straight edges 3a'–7a' of the slit-forming blades 3a, 7a and the supporting connections 6b, 10b or 4b, 8b in order to increase the overlap of the blades during a charging or cocking operation. In other words in cocking the shutter the slit-forming blade on one side normally becomes an obstacle to the support connection on the other side (corresponding to 6b or 10b in the first embodiment and 4b or 8b in the second embodiment) so that in order to increase the overlapping part the lengths of the supporting part and the straight edge part of the blade have to be increased and accordingly the size of the slit-forming blades are increased. On the contrary according to the invention there is no obstacle to increasing the overlap. Moreover, the shutter blades can be reduced and an extremely small-sized shutter can be constructed. By making the slit-forming shutter blades small the inertia of the shutter can be reduced. At the same time the force applied to the various drive members or levers and the auxiliary levers may be reduced thereby improving the durability of these members.

Furthermore, in the conventional focal plane shutters slit-forming shutter blade of the shutter-opening group and the paired levers thereof and that of the shutter-closing group are constructed similarly but are different because they are arranged differently. According to the present invention the slit-forming shutter blades and paired parallel levers thereof are constructed the same which makes it possible to improve the manufacturing since there is no need for specialization in the manufacture thereof of the different groups.

What we claim and desire to secure by Letters Patent is:

1. In a focal plane shutter, in combination, a pair of opposed plates defining a space therebetween and each having registering apertures defining a shutter aperture, two groups of shutter blades constituting a first group for opening the shutter aperture normally in a first operative position closing the shutter aperture when the shutter is in a cocked condition and operable to a second operative position opening the shutter aperture, and a second group of shutter blades normally disposed in a first operative position alongside the shutter aperture and operable to a second operative position for closing the shutter to terminate a photographic exposure, each group of shutter blades having a slit-forming shutter blade having a straight edge for travelling across the shutter aperture, the slit-forming shutter blade in the first group of shutter blades constituting a trailing shutter blade and said straight edge thereon constituting a trailing edge controlling defining of an increasing exposure aperture slit as the shutter aperture is opened, the slit-forming shutter blade in the second group of shutter blades constituting a leading shutter blade and said straight edge thereon constituting a leading edge controlling defining of a decreasing exposure aperture slit as the shutter aperture is closed, each group of shutter blades having a driven lever pivotally mounted on one end and a free end thereof connected to said slit-forming shutter blade of the corresponding group of shutter blades, each group of shutter blades having an auxiliary lever pivotally mounted at one end and a free end thereof connected to said slit-forming blade of the corresponding group, the free ends of the auxiliary levers of each group being connected to the corresponding slit-forming shutter blades at a common plane passing through said shutter aperture means, pivotally mounting the driven levers and auxiliary levers independently on a common plane passing alongside the shutter aperture, driving means for each group for driving the remainder of the shutter blades of each group other than the slit-forming shutter blade of each group in conjunction with said driven lever thereof, the means pivotally mounting the auxiliary lever for each group pivotally mounting the remainder of said shutter blades at a common pivot with the corresponding auxiliary lever for pivoting about a common pivot im the same plane in which the driven levers and auxiliary levers pivot, the levers of said first group being a mirror image of the second group and the slit-forming shutter blades of each group being disposed remotest from each other and the remainder of shutter blades of both groups being disposed therebetween.

2. In a focal plane shutter according to claim 1, in which said driving means comprises an actuating pin extending from the driven lever of a group through said remainder of shutter blades of the same group, and said remainder of shutter blades having elongated slots of various lengths into which said pin extends disposed for actuation to positions in which said remainder of blades are arranged fan-shaped.

3. In a focal plane shutter according to claim 1, in which said driven levers and auxiliary levers are disposed outwardly of the corresponding slit-forming shutter blades.

4. In a focal plane shutter according to claim 3, in which said shutter blades of both groups are arranged in reverse sequence vertically in interleaved positions.

5. In a focal plane shutter according to claim 1, in which the driven lever and said remainder of shutter blades of each group are superposed.

* * * * *